United States Patent [19]
Jo

[11] Patent Number: 5,285,266
[45] Date of Patent: Feb. 8, 1994

[54] MOTION-ADAPTIVE LUMINANCE/CHROMINANCE SEPARATOR

[75] Inventor: Hyun-Duk Jo, Kyonggi, Rep. of Korea

[73] Assignee: Samsung Electronics Co., Ltd., Kyunggi, Rep. of Korea

[21] Appl. No.: 915,502

[22] Filed: Jul. 20, 1992

[30] Foreign Application Priority Data

Jul. 19, 1991 [KR] Rep. of Korea ............... 91-12380

[51] Int. Cl.$^5$ .............................................. H04N 9/78
[52] U.S. Cl. ............................. 348/665; 348/700
[58] Field of Search ............... 358/31, 105, 36, 37, 358/166, 167, 21 R; H04N 9/64, 9/77, 9/78

[56] References Cited

U.S. PATENT DOCUMENTS

| | | | |
|---|---|---|---|
| 4,754,322 | 6/1988 | Okuda | 358/37 |
| 4,764,964 | 8/1988 | Tanaka | 358/31 |
| 4,868,650 | 9/1989 | Weckenbrock | 358/31 |
| 4,979,036 | 12/1990 | Carey Smith | 358/105 |
| 5,028,996 | 7/1991 | Takahashi | 358/105 |
| 5,144,427 | 9/1992 | Kitaura | 358/133 |
| 5,177,610 | 1/1993 | Wilkinson | 358/105 |

FOREIGN PATENT DOCUMENTS

63-227294 9/1988 Japan .

Primary Examiner—James J. Groody
Assistant Examiner—Sherrie Hsia
Attorney, Agent, or Firm—Sughrue, Mion, Zinn, Macpeak & Seas

[57] ABSTRACT

An image signal treatment apparatus prevents degradation of picture quality which can occur because of various interferences phenomena arising from causes such as a hanging dot and its motion. The inventive apparatus performs proper correlation by taking into account the motion components of a composite image signal during Y/C signal separation. The inventive apparatus separates the luminance and chrominance signals of the composite image signal according to the motion components with respect to the composite image signal during separation. The apparatus is provided with filters which output luminance and chrominance signals by filtering the composite image signal horizontally, vertically and temporally. Motion detection circuitry outputs detection coefficients by detecting vertical and horizontal motion of the composite image signal. Mixers are provided to mix the luminance and chrominance signals outputted from the filters according to the detection coefficients of the respective motion detection circuitry. Adders add respectively the luminance and chrominance signals from the mixers, and amplifiers amplify and output respectively the luminance and chrominance signals outputted from the adders.

9 Claims, 5 Drawing Sheets

MOTION-ADAPTIVE LUMINANCE/CHROMINANCE SEPARATOR

BACKGROUND OF THE INVENTION

The present invention relates to an image signal processing apparatus, and more particularly to a motion-adaptive type luminance (Y) and chrominance (C) signal separator which can improve picture quality by separating luminance and chrominance signals based on vertical and horizontal motion components which arise during the separation of luminance (Y) and chrominance (C) signals from composite image signals.

Conventionally, in order to process luminance and chrominance signals, first they were separated from composite image signals, and then were separated using a comb filter.

However, in using a comb filter to separate Y and C signals, picture quality was degraded because of failure to consider the issue of correlation between motion components of the signals. As a result, the conventional method was unable to prevent various interference phenomena such as those caused by a so-called hanging dot and its motion.

A hanging dot arises from the following situation. FIGS. 1A and 1B represent a portion of a color carrier signal before and after processing through a comb filter, respectively. In FIG. 1A, the central part of the color carrier signal portion has both a luminance and a chrominance signal component, whereas the outer part has only a luminance signal component. There is a boundary between the two. In FIG. 1B, after being passed through a comb filter, the boundary has dotted portions on at least two sides. Those dotted boundary parts are caused by a hanging dot, which can move along that boundary part to provide the dotted effect shown in FIG. 1B.

In view of this problem, it would be desirable to consider effects of motion components of the signals during separation, thus taking into account the need for correlation.

SUMMARY OF THE INVENTION

Accordingly, it is one object of the present invention to separate luminance and chrominance signals while taking into account motion components with respect to the signals during the separation of luminance and chrominance signals from composite image signals. This approach can improve picture quality by preventing interference phenomena such as those caused by a hanging dot and its motion.

In accordance with one aspect of the present invention, a motion-adaptive type Y/C separator is provided with filtering apparatus for outputting luminance and chrominance signals by filtering a composite image signal horizontally, vertically and temporally. In one preferred embodiment, three separate filters perform the respective horizontal, vertical, and temporal filtering. Motion detection apparatus outputs vertical and horizontal detection coefficients by detecting vertical and horizontal motion in the composite image signal. Mixing apparatus outputs the luminance and chrominance signals outputted from the filtering apparatus based on the detection coefficients of the respective motion detection apparatus.

Adders are provided to add respective luminance and chrominance signals outputted from the mixing apparatus. Finally, amplifiers are provided to amplify and output the respective the luminance and chrominance signals outputted from the adders.

BRIEF DESCRIPTION OF THE DRAWINGS

The foregoing and other objects of the present invention will be understood more fully with reference to the following detailed description taken in conjunction with the accompanying drawings, in which.

DETAILED DESCRIPTION OF THE PREFERRED EMBODIMENT

Figure 1A:
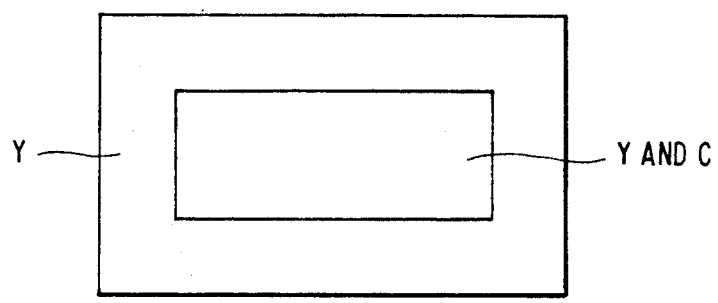
FIGS. 1A and 1B represent a portion of a color carrier signal before and after passing through a comb filter, respectively.
Figure 1B:
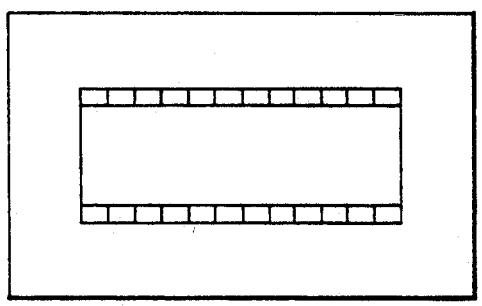
Figure 2:
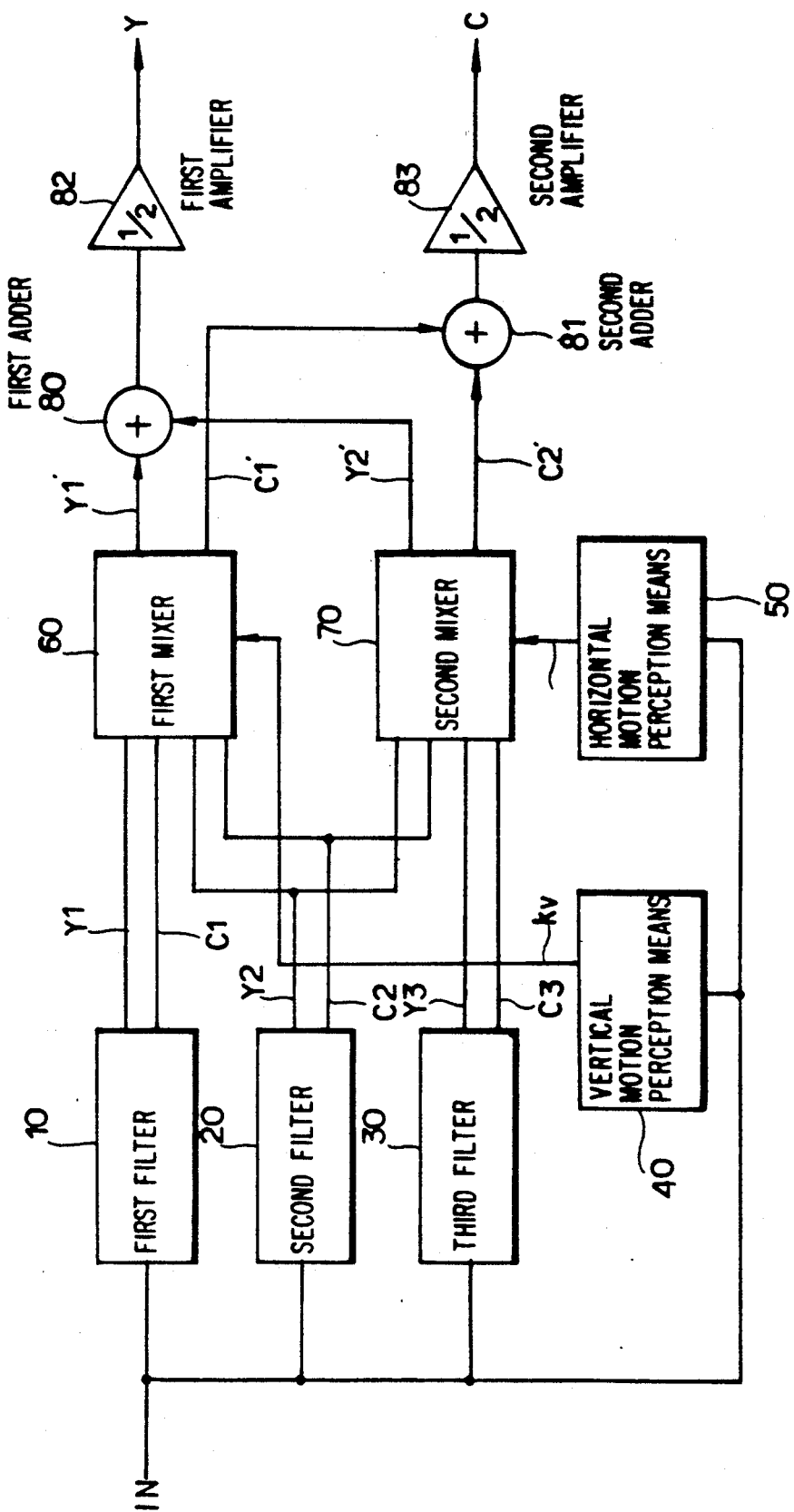
FIG. 2 is a block diagram of a motion-adaptive type Y/C separator in accordance with the present invention.

FIG. 2 is a block diagram of a motion-adaptive type Y/C separator in accordance with the present invention. Filters 10, 20, and 30 output luminance and chrominance signals by filtering a composite image signal horizontally, vertically and temporally, respectively. A first filter 10 performs line-comb-filtering of the composite image signal inputted into the input terminal (IN). A second filter 20 performs frame-comb-filtering of the composite image signal. A third filter 30 performs low-pass-filtering of the luminance signal in the composite image signal, and performs band-pass-filtering of the chrominance signal in the composite image signal.

Motion detection circuitry 40, 50 output detection coefficients by detecting vertical and horizontal motion, respectively, with respect to the composite image signal. Vertical motion detection circuitry 40 receives the composite image signal, and senses vertical motion by utilizing the vertical correlation between the image signal on the line to be processed, and the image signals on the lines immediately above and below the line to be processed. Horizontal motion detection circuitry 50 also receives the composite image signal, and senses horizontal motion by utilizing the horizontal correlation between the pixels of the image signal on the line to be processed.

Mixers 60, 70 mix the luminance and chrominance signals outputted from the filters 10, 20, and 30 in accordance with the horizontal and vertical detection coefficients output from the motion detection circuitry 40, 50. A first mixer 60 outputs a luminance signal Y1' and a chrominance signal C1' by mixing first and second luminance signals Y1, Y2 and chrominance signals C1, C2 filtered by the first and second filters 10, 20 in accordance with vertical motion detection coefficient KV outputted from vertical motion detection circuitry 40. A second mixer 70 outputs a luminance signal Y2' and a chrominance signal C2' by mixing the second and third luminance signals Y2, Y3 and chrominance signals C2, C3 filtered by the second and third filters 20, 30 in accordance with the horizontal motion detection coefficient Kh outputted from horizontal motion detection circuitry 50.

A first adder 80 adds luminance signals Y1' and Y2' output by first and second mixers 60, 70. A first amplifier 82 receives the output of adder 80 and multiplies it by one-half to provide the luminance signal Y of the input composite image signal. A second adder 81 adds chrominance signals C1' and C2' output by the first and second mixers 60, 70. A second amplifier 83 receives the output of adder 81 and multiplies it by one-half to provide the chrominance signal C of the input composite image signal.

Accordingly, when a composite image signal is inputted into the input terminal IN of FIG. 2, a first filter 10 separates first luminance and chrominance signals Y1, C1, using line-comb-filtering, and then outputs them. A second filter 20 separates second luminance and chrominance signals Y2, C2, using frame-comb-filtering, and then outputs them. A third filter 30 outputs a third luminance signal Y3 by low-pass-filtering, and a third chrominance signal C3 by band-pass-filtering.

Responsive to the input composite image signal, vertical motion detection circuitry 40 outputs a vertical motion detection coefficient KV by utilizing the vertical correlation between the image signal on the line to be processed and the image signals on the lines immediately above and below the line to be processed.

In one embodiment, vertical motion detection circuitry 40 is constructed of a line delayer and a comparator. In other words, the vertical movement of a line to be processed, and of lines immediately above and below the line to be processed, is detected. The magnitude of that movement then is outputted as the detection coefficient KV.

Also responsive to the input composite image signal, horizontal motion detection circuitry 50 outputs the horizontal motion detection coefficient Kh by utilizing the horizontal correlation between pixels of the image signal on the line to be processed.

In one embodiment, horizontal motion detection circuitry 50 is constructed of a pixel delayer and a comparator. The movement of the image signal on the line to be processed, and of the pixels before and after in the horizontal direction, is detected, and the movement magnitude then is outputted as the detection coefficient Kh.

The first mixer 60 outputs first luminance and chrominance signals Y1', C1' by mixing first and second luminance and chrominance signals Y1, Y2, C1, C2, separately outputted from the first and second filters 10, 20 according to the vertical motion detection coefficient KV outputted from vertical motion detection circuitry 40.

The second mixer 70 outputs second luminance and chrominance signals Y2', C2' by mixing second and third luminance and chrominance signals Y2, Y3, C2, C3 separately outputted from the second and third filters 20, 30 according to the horizontal motion detection coefficient Kh outputted from horizontal motion detection circuitry 50.

First and second luminance and chrominance signals Y1', Y2', C1', C2' outputted from the first and second mixers 60, 70 are added at the first and second adders 80, 81 respectively, and are amplified by ½ respectively at first and second amplifiers 82, 83, to be outputted as luminance signal Y and chrominance signal C, respectively.

In the manner just described, because the motion-adaptive type Y/C separator in accordance with the present invention separates the luminance and chrominance components of an input composite image signal using horizontal and vertical motion detection information, various interference phenomena caused by a hanging dot and its motion are decreased.

Figure 3:
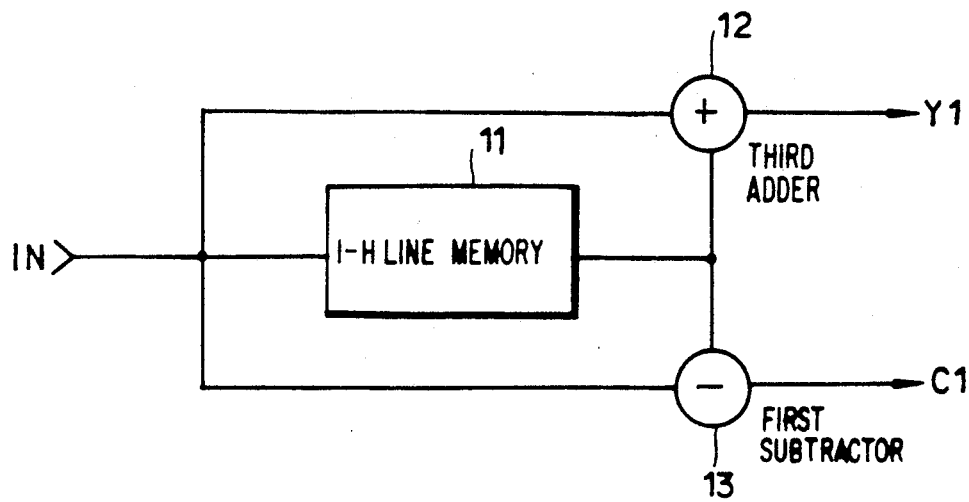
FIG. 3 is a block diagram of a first filter in FIG. 2.

FIG. 3 is a block diagram of the first filter 10 of FIG. 2. In FIG. 3, a 1H-line memory 11 delays by one line the composite image signal inputted from input terminal IN. A third adder 12 adds the input composite image signal to the composite image signal delayed by one horizontal line by the 1H-line memory 11, and outputs a first luminance signal Y1. A first subtracter 13 subtracts the composite image signal, delayed by one horizontal line by the 1H-line memory 11, from the input composite image signal, and outputs the first chrominance signal C1.

Figure 4:
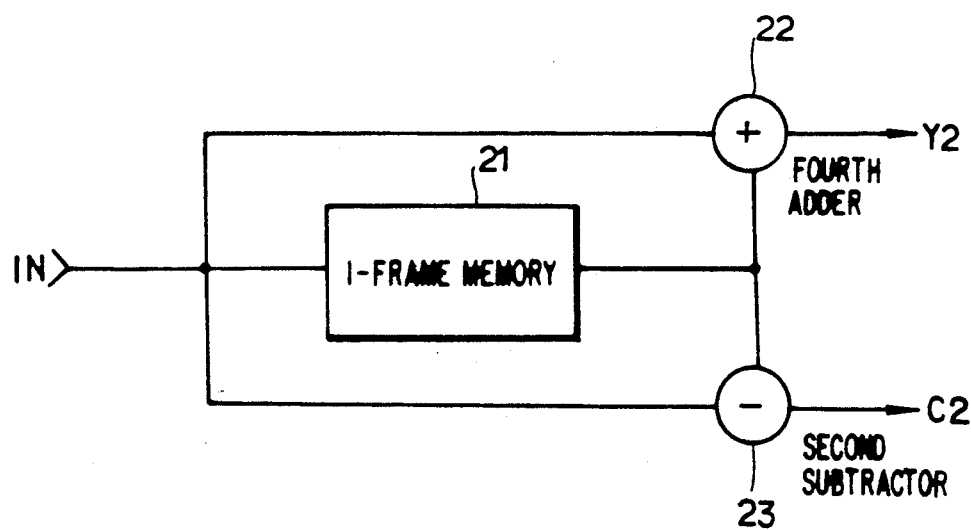
FIG. 4 is a block diagram of a second filter in FIG. 2.

FIG. 4 is a block diagram of the second filter 20 of FIG. 2. In FIG. 4, a one-frame memory 21 delays by one frame the composite image signal inputted from input terminal IN. A fourth adder 22 adds the input composite image signal inputted from input terminal IN to the composite image signal, delayed by one frame by the one-frame memory 21, and outputs the second luminance signal Y2. A second subtracter 23 subtracts the composite image signal, delayed by one frame by the one-frame memory 21, from the input composite image signal inputted from input terminal IN, and outputs the second chrominance signal C2.

Figure 5:
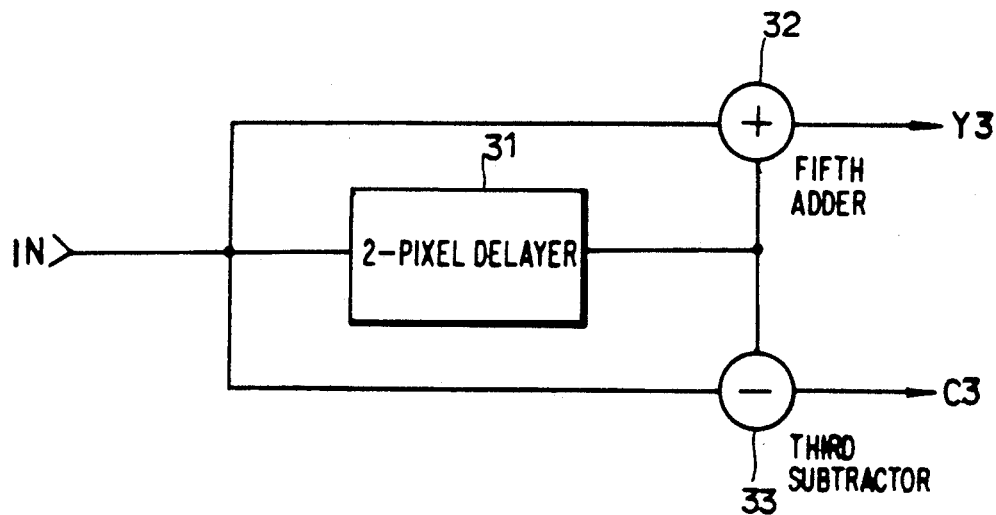
FIG. 5 is a block diagram of a third filter in FIG. 2.

FIG. 5 is a block diagram of the third filter 30 of FIG. 2. In FIG. 5, a two-pixel delayer 31 delays by two pixels the composite image signal inputted from input terminal IN. A fifth adder 32 adds the input composite image signal inputted from input terminal IN to the composite image signal, delayed by two pixels by the two-pixel delayer 21, and outputs the third luminance signal Y3. A third subtracter 33 subtracts the composite image signal, delayed by two pixels by the two-pixel delayer 31, from the input composite image signal inputted from input terminal IN, and outputs the third chrominance signal C3.

Figure 6:
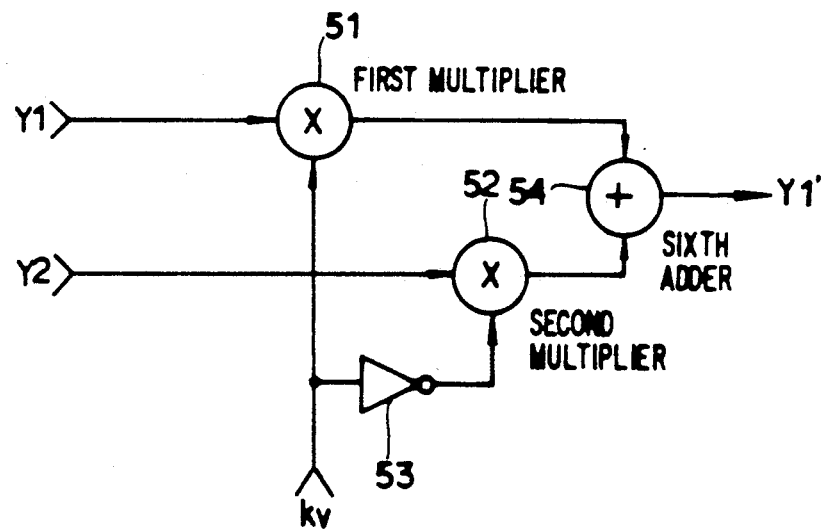
FIG. 6 is a block diagram of the circuitry for providing a luminance output from a first mixer in FIG. 2.

FIG. 6 is a block diagram of a portion of the first mixer 60 of FIG. 2 which provides luminance output Y1'. In FIG. 6, a first multiplier 51 multiplies the first luminance signal Y1, outputted from the first filter 10 of FIG. 2, by the vertical motion detection coefficient KV outputted from vertical motion detection circuitry 40. An inverter 53 provides the complement 1-KV of the vertical motion detection coefficient KV outputted from vertical motion detection circuitry 40. A second multiplier 52 multiplies the complement 1-KV of the vertical motion detection coefficient KV, outputted from vertical motion detection circuitry 40, by the second luminance signal Y2 outputted from the second filter 20. A sixth adder 54 adds the output of the first and second multipliers 51, 52, and outputs luminance signal Y1'.

Similar construction to that in FIG. 6 yields circuitry which outputs a chrominance signal C1' by mixing first and second chrominance signals C1, C2 outputted from first and second filters 10, 20 according to the vertical motion detection coefficient KV outputted from vertical motion detection circuitry 40. Likewise, similar construction yields circuitry which outputs luminance and chrominance signals Y2', C2' by mixing second and third luminance and chrominance signals Y2, Y3, C2, C3 according to the horizontal motion detection coefficient Kh outputted from horizontal motion detection circuitry 50.

Accordingly, the luminance and chrominance signals Y1', C1' output by the first mixer 60 can be described by the following equations:

$$Y1' = KV\, Y1 + (1-KV)Y2 = Y2 + (Y1-Y2)KV \quad (1)$$

$$C1' = KV\, C1 + (1-KV)C2 = C2 + (C1-C2)KV \quad (2)$$

The luminance and chrominance signals Y2', C2' output by the second mixer 70 can be described by the following equations:

$$Y2' = Kh\, Y3 + (1-Kh)Y2 = Y2 + (Y3-Y2)Kh \quad (3)$$

$$C2' = Kh\, C3 + (1-Kh)C2 = C2 + (C3-C2)Kh \quad (4)$$

In other words, luminance and chrominance signals are obtained by the separated luminance and chrominance signals which are filtered by the filters of FIG. 2 and FIGS. 3, 4, 5, and mixed by the detection coefficients KV, Kh according to the movement magnitudes of horizontal and vertical directions detected from the composite image signal.

Figure 7A:
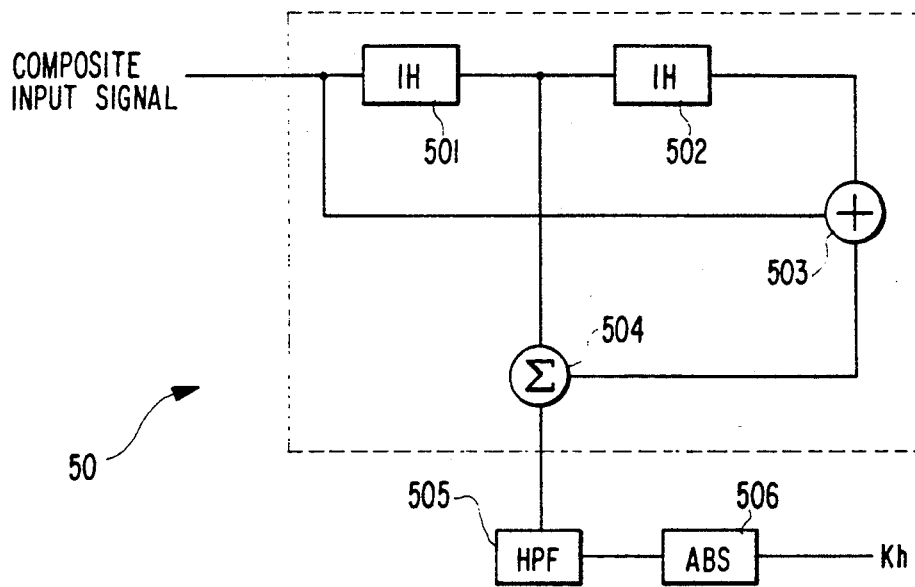
FIGS. 7A and 7B are block diagrams of horizontal and vertical motion detection circuitry in FIG. 2.

In FIG. 7A, which is a block diagram of one embodiment of the horizontal motion detection circuitry 50, the composite image signal is input to a 1H-line memory 501, the output of which is input to another 1H-line memory 502. The composite image signal also is provided to an adder 503, which receives as its other input the output of 1H-line memory 502. The output of adder 503 is passed to adder 504, which receives as its output the output of 1H-line memory 501. A high-pass filter 505, preferably having a bandwidth between 3 MHz and 4 MHz, receives the output of adder 504, and provides an output in turn to absolute circuit 506, whose output is the horizontal detection coefficient Kh.

Figure 7B:
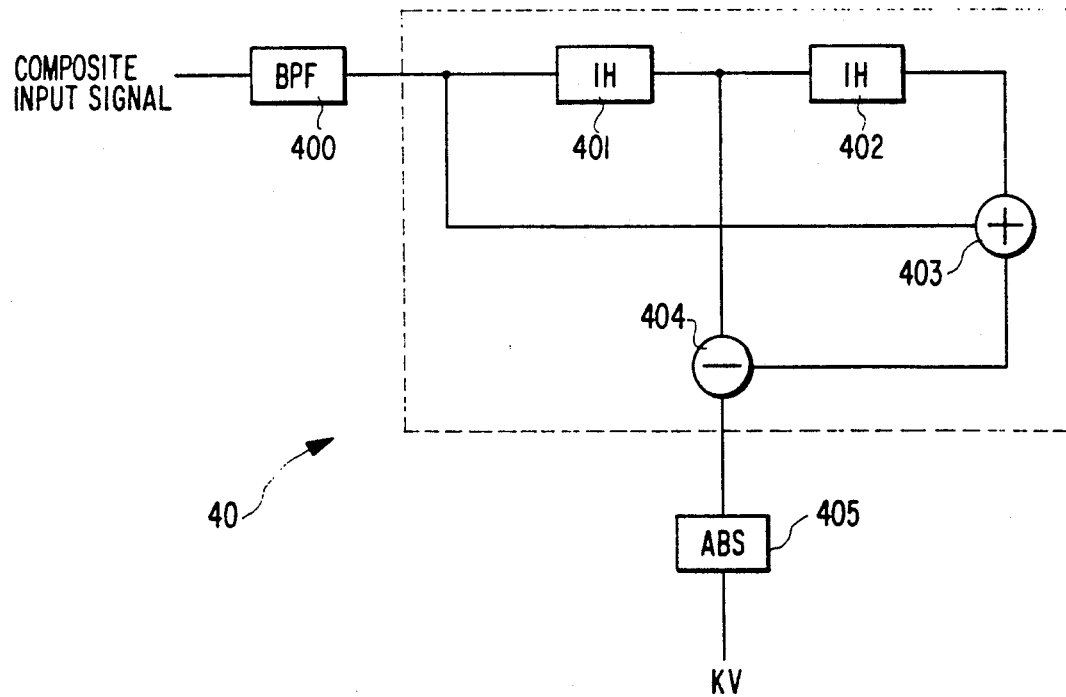

In FIG. 7B, which is a block diagram of one embodiment of the vertical motion detection circuitry 40, the composite image signal is input to a band-pass filter 400, preferably having a bandwidth between 0 and 3 MHz. The output of filter 400 is provided to a 1H-line memory 401, the output of which is input to another 1H-line memory 402. The output of filter 400 also is provided to an adder 403, which receives as its other input the output of 1H-line memory 402. The output of adder 403 is passed to subtracter 404, which receives as its output the output of 1H-line memory 401. An absolute circuit 405 receives the output of subtracter 404, and outputs the vertical detection coefficient KV.

Based on the foregoing, it can be seen that a motion-adaptive type Y/C separator in accordance with the present invention separates luminance and chrominance signals according to the motion components with respect to the signal during the separation of luminance and chrominance signals from the input composite image signal, thereby preventing interference phenomena caused by a hanging dot and its motion, and thus improving picture quality.

What is claimed is:

1. A motion-adaptive type luminance/chrominance (Y/C) separator, comprising:

filtering means, receiving an input composite image signal, for filtering said composite image signal horizontally, vertically, and temporally, and outputting luminance and chrominance signals accordingly;

motion detection means, receiving said input composite image signal, for detecting vertical and horizontal motion of said composite image signal and outputting vertical and horizontal detection coefficients accordingly;

mixing means, receiving said luminance and chrominance signals outputted from said filtering means, and responsive to said vertical and horizontal detection coefficients of said motion detection means, for outputting first and second mixed luminance signals and first and second mixed chrominance signals;

a first adder for adding said first and second mixed luminance signals and providing an additive luminance signal accordingly;

a second adder for adding said first and second mixed chrominance signals and providing an additive chrominance signal accordingly; and amplifying means for respectively amplifying said additive luminance signal and said additive chrominance signal to provide output luminance and chrominance signals accordingly.

2. A motion-adaptive type Y/C separator as defined in claim 1, wherein said filtering means includes:

a first filter for line-comb-filtering said input composite image signal to perform horizontal filtering;

a second filter for frame-comb-filtering said input composite image signal to perform vertical filtering; and a third filter for band-pass-filtering the chrominance signal in the input composite image signal and for low-pass-filtering the luminance signal in the input composite image signal, to perform temporal filtering.

3. A motion-adaptive type Y/C separator as defined in claim 1, wherein said motion detection means includes:

vertical motion detection means for detecting vertical motion on the basis of a vertical correlation between an image signal on a line to be processed, and image signals on lines immediately above and below the line to be processed, and outputting said vertical motion detection coefficient accordingly; and horizontal motion detection means for detecting horizontal motion on the basis of a horizontal correlation between pixels of the image signal on the line to be processed, and outputting said horizontal motion detection coefficient accordingly.

4. A motion-adaptive type Y/C separator as defined in claim 3, wherein said mixing means includes:

a first mixer for outputting said first mixed luminance signal and said first mixed chrominance signal by mixing the luminance and chrominance signals from said filtering means in accordance with the vertical motion detection coefficient outputted by said vertical motion detection means; and a second mixer for outputting a second luminance signal and a second chrominance signal by mixing the luminance and chrominance signals from said filtering means in accordance with the horizontal motion detection coefficient outputted from said horizontal motion detection means.

5. A motion-adaptive type Y/C separator as defined in claim 2, wherein said first filter includes:

a first 1H-line memory for delaying said input composite image signal by one line and providing a first delayed composite image signal;

a third adder for adding said input composite image signal and said first delayed composite image signal and providing one of said luminance signals accordingly; and a first subtracter for subtracting said first delayed composite image signal from said input composite image signal and providing one of said chrominance signals accordingly.

6. A motion-adaptive type Y/C separator as defined in claim 2, wherein said second filter includes:

a one-frame memory for delaying said input composite image signal by one frame and providing a second delayed composite image signal accordingly;

a fourth adder for adding said input composite image signal and said second delayed composite image signal and outputting another of said luminance signals accordingly; and a second subtracter for subtracting said second delayed composite image signal from said input composite image signal and outputting another of said chrominance signals accordingly.

7. A motion-adaptive type Y/C separator as defined in claim 2, wherein said third filter includes:

a pixel delayer for delaying said input composite image signal by two pixels and providing a third delayed composite image signal accordingly;

a fifth adder for adding said input composite image signal and said third delayed composite image signal and outputting another of said luminance signals; and a third subtracter for subtracting said third delayed composite image signal from said input composite image signal and outputting another of said chrominance signals.

8. A motion-adaptive type Y/C separator as defined in claim 3, wherein said horizontal motion detection means comprises:

a second 1H-line memory for delaying said input composite image signal by one line;

a third 1H-line memory for delaying an output of said second 1H-line memory by one line;

a seventh adder for adding said input composite image signal and an output of said third 1H-line memory;

an eighth adder for adding said output of said second 1H-line memory and an output of said seventh adder;

a fourth filter for high-pass-filtering an output of said eighth adder; and a first absolute circuit for outputting said horizontal motion detection coefficient in response to an output of said fourth filter.

9. A motion-adaptive type Y/C separator as defined in claim 3, wherein said vertical motion detection means comprises:

a fifth filter for band-pass-filtering said input composite image signal;

a fourth 1H-line memory for delaying an output of said fifth filter by one line;

a fifth 1H-line memory for delaying an output of said fourth 1H-line memory by one line;

a ninth adder for adding said output of said fifth filter and an output of said fifth 1H-line memory;

a fourth subtracter for subtracting an output of said ninth adder from said output of said fourth 1H-line memory; and a second absolute circuit for outputting said vertical motion detection coefficient in response to an output of said fourth subtracter.

* * * * *